United States Patent [19]

Behrens

[11] 4,012,332

[45] Mar. 15, 1977

[54] RUBBER VULCANIZATION ACCELERATOR COMPOSITION

[75] Inventor: Rudolf Adolf Behrens, Gladstone, N.J.

[73] Assignee: American Cyanamid Company, Stamford, Conn.

[22] Filed: Mar. 16, 1976

[21] Appl. No.: 667,326

Related U.S. Application Data

[63] Continuation of Ser. No. 438,098, Jan. 30, 1974, abandoned.

[52] U.S. Cl. .................. 252/182; 260/45.8 SN; 260/79.5 B; 260/785
[51] Int. Cl.² ................. C08K 5/40; C08K 5/43; C08K 5/44
[58] Field of Search ....... 252/182, 79.5 B, 45.8 SN, 252/785

[56] References Cited

UNITED STATES PATENTS

| 3,644,304 | 2/1972 | Behrens | 260/79.5 B |
| 3,844,970 | 10/1974 | Kempermann et al. | 252/182 |

OTHER PUBLICATIONS

Encyclopedia of Polymer Science and Technology, John Wiley (1970) pp. 258–259, vol. 12.

*Primary Examiner*—Benjamin R. Padgett
*Assistant Examiner*—Irwin Gluck
*Attorney, Agent, or Firm*—Charles J. Fickey

[57] ABSTRACT

The present invention is based on the discovery of an accelerator composition for the vulcanization of diene elastomers, comprising a benzothiazole sulfenamide, a thiuram sulfide and copper 2-mercaptobenzothiazole.

10 Claims, No Drawings

RUBBER VULCANIZATION ACCELERATOR COMPOSITION

This is a continuation, of application Ser. No. 438,098, filed Jan. 30, 1974, now abandoned.

Generally stated, the subject matter of the present invention relates to the vulcanization of diene elastomers. More particularly, the invention relates to an improved accelerator composition for the vulcanization of diene elastomers, as well as to a method of vulcanization therewith.

BACKGROUND OF THE INVENTION

It is well known that in the manufacture of rubber products crude or raw rubber is compounded with various ingredients, among which are sulfur and accelerators of vulcanization. The primary function of an accelerator or any combination thereof, is to increase the rate of the vulcanization process, consistent with sufficient time to mix the accelerators into the rubber at an elevated temperature before vulcanization commences, commonly referred to as scorch time. Secondary effects are almost of equal importance and include improved tensile strength, set, hysteresis and aging properties, among others. However, from the rubber compounders point of view, behavior is more important than chemical composition, and he is more likely to be concerned with cure rate and cure time, scorch behavior; the extent of cure, and compatibility, when using any one or combination of accelerators in a vulcanization process.

An accelerator may provide too slow a cure rate when used alone. It may be speeded up by adding small amounts of another accelerator. This added accelerator is called an "activator" and its use is called "activation." The accelerators which are most commonly "activated" are the thiazoles, including thiazole sulfenamides. The accelerators most commonly used as "activators" are the thiuram sulfides, dithiocarbamates and guanidines. The common ratios of about one part per hundred of rubber of the thiazole to 0.1 to about 0.3 part per hundred of rubber of the "activator" leads to the characterization of the thiazoles as "primary accelerators" and to the activators as "secondary accelerators."

Among the "primary accelerators" benzothiazole sulfenamides are commonly used in the vulcanization of a wide range of diene rubber compositions. They are frequently used in combination with thiuram sulfide and dithiocarbamate "secondary accelerators," which are powerful activators and tend to be fast curing and "scorchy," i.e., they tend to cause premature vulcanization. This is evidenced by the small amounts which are required for activation. A ratio of 10 to 1 of thiazole sulfenamide to activator is common practice.

One of the most widely used accelerator combinations for diene rubbers consists of a benzothiazole sulfenamide and a thiuram sulfide or dithiocarbamate. It is safe, that is not scorchy, provides adequate rate of cure in a reasonable length of time, and results in rubber compositions with good physical properties. Nevertheless, in commercial operations, e.g., in the manufacture of automobile tires, it is always desirable to improve productivity and cost. One means for increasing productivity is to reduce vulcanization time without sacrifice in quality or operating safety. In the past, various cure systems have been evaluated, some of which significantly increased the rate of cure, but at a cost in reduced processing safety, scorch, which has restricted their use.

THE INVENTION

The present invention is based on the discovery of an accelerator composition for the vulcanization of diene elastomers, comprising a benzothiazole sulfenamide, a thiuram sulfide and copper 2-mercaptobenzothiazole.

The invention provides a greatly increased rate of cure and shortened cure time, adequate processing safety, and excellent physical properties. This is surprising since it would have been expected that the use of copper 2-mercaptobenzothiazole in the vulcanization of diene elastomers would have reduced processing safety significantly. For example, the vulcanization of a styrene-butadiene elastomer with copper 2-mercaptobenothiazole and a thiuram sulfide accelerator combination is scorchy. Similarly, vulcanization with a benzothiazole sulfenamide and a copper dithiocarbamate was even more scorchy. These effects are shown in the accompanying examples.

The diene elastomers which are effectively vulcanized with the accelerator composition of the invention include the general purpose diene elastomers such as SBR rubber (styrene-butadiene copolymers), natural rubber, cis-4-polybutadiene, polyisoprene, and other butadiene elastomers such as butadiene-acrylonitrile elastomers, and blends thereof.

The benzothiazole sulfenamide accelerators which are useful in combination with thiurams and copper 2-mercaptobenzothiazole in accordance with the invention include N-oxydiethylene benzothiazole-2-sulfenamide, N-cyclohexyl benzothiazole-2-sulfenamide, N,N-diisopropyl benzothiazole-2-sulfenamide, N-tert-butyl benzothiazole-2-sulfenamide, and the like.

The thiuram sulfide accelerators useful in the invention include tetramethyl thiuram mono- and disulfides, tetraethyl thiuram disulfide, tetrabutyl thiuram disulfide, dipentamethylene thiuram hexasulfide, dicyclohexamethylene thiuram disulfide, diisopropyl thiuram disulfide, bis(morpholinothiocarbonyl) sulfide, as disclosed in U.S. Pat. No. 3,531,444, and the like.

Various metal dithiocarbamates may also be used in combination with the sulfenamides and copper 2-mercaptobenzothiazole. All of the commonly used metal dithiocarbamates are useful except for copper dithiocarbamates. The copper dithiocarbamates used in combination with copper 2-mercaptobenzothiazole and a sulfenamide result in an extremely scorchy vulcanization system, as is shown in the examples. Among the more commonly used metal dithiocarbamates are the zinc, cadmium, tellurium, bismuth, nickel, selenium and lead salts of the various thiuram disulfides described above, e.g., zinc dimethyldithiocarbamate, cadmium diethyldithiocarbamate, zinc diethyldithiocarbamate, and the like.

Generally, the sulfenamide component of the accelerator composition of the invention is used at a concentration of from about 0.1 to 1.5 parts per hundred parts of elastomer, the thiuram sulfide or dithiocarbamate at about 0.02 to 1.5 parts per hundred of elastomer, and the copper 2-mercaptobenzothiazole at about 0.002 to 1.5 parts per hundred of elastomer. It will be obvious to those skilled in the art that many factors may operate to determine the concentrations which may be used in any given situation, such as the nature of the elastomer (natural rubber and cis-polyisoprene require less accelerator than the synthetic butadiene styrene or butadieneacrylonitrile elastomers), and the kind of cure behavior desired, and it is well within the skill of those to whom the invention pertains to determine the optimum levels of concentration. As a rule, the sulfenamide, thiuram sulfide (or dithiocarbamate) and copper 2-mercaptobenzothiazole will be used in the weight ratios of from about 10:1:0:0.05 to 1:1:1, respectively.

Copper 2-mercaptobenzothiazole is disclosed in U.S. Pat. No. 3,644,304, as an accelerator for the vulcanization of diene modified ethylene-propylene rubber (EPDM) in combination with a thiuram sulfide and/or a metal dithiocarbamate.

The combination accelerator system of this invention may be used alternatively as a premixed blend of the components, particularly as a stabilized blend, in accordance with the disclosure of Case No. 25,165. When used in this manner, the stabilizer may be added to the blend at a concentration of from about 1 to 5 percent by weight, based on the total weight of the three accelerator components.

In addition to the accelerator composition of this invention, it is understood that the elastomer composition to be vulcanized will contain sulfur, and may contain a variety of other conventional rubber compounding ingredients, such as pigments, especially carbon black, clays, silica, titanium dioxide, antioxidants, processing oils, zinc oxide, lubricants, such as stearic acid, waxes, and the like, without detracting from the advantages of the invention.

The following examples are provided for illustrative purposes and may include particular features of the invention. However, the examples should not be construed as limiting the invention, many variations of which are possible without departing from the spirit or scope thereof.

EXAMPLE I

Preparation of Rubber Masterbatch

The following formulation is common to all of the illustrative examples:

|  | Parts by Weight |
|---|---|
| Styrene-butadiene Rubber (SBR 1712) | 96.3 |
| Cis-4-polybutadiene | 30.0 |
| Carbon Black | 70.0 |
| Processing Oil (Sundex 790, Sun Oil Co.) | 13.7 |
| Zinc Oxide | 5.0 |
| Stearic Acid | 1.0 |
| Antioxidant[1] | 1.0 |
| Sulfur | 1.8 |

[1]N-(1,3-dimethylbutyl)-N'-phenyl-p-phenylenediamine

The various additives shown in the following examples were compounded into the above masterbatch formulation using conventional rubber compounding techniques, and vulcanized by compression molding methods for 25 minutes at 316° F.

TABLE 1

|  | A | B | C | D |
|---|---|---|---|---|
| Compound |  |  |  |  |
| NOBS Special[1] | 1.0 | 1.0 | 0.85 | 0.85 |
| MBTS | — | — | — | — |
| Cupsac[2] | — | — | 0.15 | 0.15 |
| Cyuram DS (TMTD)[3] | 0.30 | — | — | 0.30 |
| Cyuram MS (TMTM)[4] | — | — | 0.30 | — |
| Copper Dithiocarbamate | — | 0.30 | — | — |
| Mooney Scorch at 270° F |  |  |  |  |
| $T_5$ | 24.7 | 3.7 | 14.8 | 10.9 |
| Minimum Plast. | 39 | 48 | 40 | 40 |
| Oscillating Disc Rheometer at 316° F. |  |  |  |  |
| Maximum Cure Rate [5] | 7.6 | 6.6 | 14.0 | 15.0 |
| 90 % Cure Time (min) | 12.3 | 8.0 | 8.7 | 7.7 |
| Maximum Torque (inch-pounds) | 57.5 | 60.0 | 62.0 | 63.0 |
| Instron Stress-Strain Cure at 316° F. |  |  |  |  |
| Modulus at 300 %, psi | 1,900 | 2,000 | 1,850 | 1,995 |
| Tensile, psi | 2,500 | 2,590 | 2,550 | 2,700 |
| Elongation, % | 400 | 410 | 400 | 390 |
| Hardness, Shore A | 60 | 57 | 59 | 60 |
| Air Aged 7 Days at 212° F. |  |  |  |  |
| Tensile, psi | 2,235 | 2,290 | 2,425 | 2,200 |
| Elongation, % | 240 | 200 | 230 | 215 |
| Hardness, Shore A | 71 | 73 | 71 | 71 |
| Change from Original |  |  |  |  |
| Tensile, % | −11 | −12 | −5 | −19 |
| Elongation EB (%) | −39 | −51 | −43 | −45 |
| Hardness, Shore A (pts) | +11 | +14 | +11 | +11 |
| Compression Set (%), 70 Hours at 158° F., Buttons Cured at 316° F. |  |  |  |  |
| 15 Minutes | 23.8 | 20.8 | 20.0 | 21.0 |
| 25 Minutes | 20.0 | 17.2 | 17.6 | 18.2 |

[1]N-Oxydiethylene benzothiazole-2-sulfenamide
[2]Copper 2-mercaptobenzothiazole
[3]Tetramethylthiuram disulfide
[4]Tetramethylthiuram monosulfide
[5]Steepest slope of cure curve in inch-pounds per one-half minute; 60 minute clock; 100 inch-pounds full scale; 60-second warm-up.

The above data show that when a small amount of copper 2-mercaptobenzothiazole replaces an equal weight of the sulfenamide (recipes A and D) in combination with a thiuram it provides twice the cure rate, a much faster cure time (7.7 minutes vs 12.3 minutes), a higher state of cure (63 inch pounds vs 57.5 inch pounds), an increase in tensile strength (200 pounds) and a slight reduction in compression set. Although the Mooney scorch is reduced, it is adequate for most purposes. This is improved somewhat by replacing tetramethyl thiuram disulfide with the monosulfide (recipe C). The data also show that although copper dithiocarbamate (recipe B) provides a short cure time (8 minutes), it has a slow cure rate and a very short scorch time (3.7 minutes).

EXAMPLE II

Using the masterbatch of Example I, a number of sulfenamides were evaluated in combination with tetramethyl thiuram monosulfide, with and without copper 2-mercaptobenzothiazole. Data are shown in Table 2.

From the data, it is evident that compositions K through S containing copper 2-mercaptobenzothiazole have much faster rates of cure and develop higher states of cure in a shorter time than compositions A through J. Scorch time is reduced somewhat, but remains adequate.

EXAMPLE III

Using the masterbatch of Example I, the accelerator combination of tetramethyl thiuram monosulfide, N-oxydiethylene benzothiazole-2-sulfenamide and copper 2-mercaptobenzothiazole was evaluated at several levels of copper 2-mercaptobenzothiazole concentration. Data are shown in Table III.

TABLE 3

|  | A | B | C | D | E | F |
|---|---|---|---|---|---|---|
| Tetramethyl thiuram sulfide | 0.14 | → | | | | |
| Copper 2-mercaptobenzothiazole | 0.0125 | 0.025 | 0.05 | 0.1 | 0.2 | 0.5 |
| N-Oxydiethylene benzothiazole-2-sulfenamide | 0.56 | → | | | | |
| Mooney Scorch at 270° F., $T_s$ | 20.2 | 17.4 | 16.5 | 13.9 | 12.4 | 12.6 |
| Monsanto Oscillating Disc Rheometer at 316° F. | | | | | | |
| Maximum Cure Rate | 4.5 | 5.2 | 6.1 | 6.7 | 7.3 | 10.3 |
| Time to 90 % Full Cure | 14.3 | 12.7 | 12.4 | 11.7 | 10.9 | 10.2 |
| Maximum Torque | 46.5 | 47.5 | 48.5 | 50.0 | 52.0 | 57.5 |

The data show an increase in cure rate and a faster development of cure as the concentration of copper 2-mercaptobenzothiazole is increased.

EXAMPLE IV

To separate 218-gram portions of the masterbatch was added 0.56 gram of N-oxydiethylene benzothiazole-2-sulfenamide and 0.14 gram of the various Table 2

| Composition: 218.8 parts of Masterbatch Plus Compounds Listed Below | | | | | | | | | | | | | | | | | | |
|---|---|---|---|---|---|---|---|---|---|---|---|---|---|---|---|---|---|---|
|  | A | B | C | D | E | F | G | H | J | K | L | M | N | O | P | Q | R | S |
| Tetramethyl thiuram sulfide | 0.14 | | | | | | | | | | | | | | | | | |
| Copper 2-mercaptobenzothiazole | | | | | | | | | | 0.05 | | | | | | | | |
| N-Cyclohexyl benzothiazole-2-sulfenamide | 0.56 | | | | | | | | | 0.56 | | | | | | | | |
| N-Tert-butyl benzothiazole-2-sulfenamide | | 0.56 | | | | | | | | | 0.56 | | | | | | | |
| 2-(2,6-Dimethylmorpholinodithio)-benzothiazole | | | 0.56 | | | | | | | | | 0.56 | | | | | | |
| N,N-Diethyl benzothiaxole-2-sulfenamide | | | | 0.56 | | | | | | | | | 0.56 | | | | | |
| N-Cyclohexamethylene benzothiazole-2-sulfenamide | | | | | 0.56 | | | | | | | | | 0.56 | | | | |
| N-Oxydiethylene benzothiazole-2-sulfenamide | | | | | | 0.56 | | | | | | | | | 0.56 | | | |
| 2-(2,6-Dimethylmorpholinothio)-benzothiazole | | | | | | | 0.56 | | | | | | | | | 0.56 | | |
| N,N-Diisopropyl benzothiazole-2-sulfenamide | | | | | | | | 0.56 | | | | | | | | | 0.56 | |
| N,N-Dicyclohexyl benzothiazole-2-sulfenamide | | | | | | | | | 0.56 | | | | | | | | | 0.56 |
| Mooney Scorch at 270° F, $T_s$ min | 20.4 | 22.4 | 13.8 | 21.8 | 22.4 | 26.4 | 24.9 | 23.4 | 22.7 | 15.1 | 16.2 | 8.5 | 14.3 | 14.8 | 16.5 | 14.2 | 11.6 | 11.6 |
| Monsanto Oscillating Disc Rheometer at 316° F | | | | | | | | | | | | | | | | | | |
| Max Cure Rate | 3.5 | 3.1 | 3.9 | 4.0 | 4.4 | 3.3 | 2.9 | 2.2 | 2.1 | 5.7 | 6.2 | 7.9 | 5.9 | 6.3 | 6.1 | 5.2 | 3.7 | 3.3 |
| Time (min) to 90 % Full Cure | 16.2 | 17.2 | 13.9 | 15.2 | 14.8 | 17.7 | 18.2 | 21.2 | 20.1 | 12.2 | 12.5 | 9.3 | 11.3 | 10.8 | 12.4 | 11.8 | 13.3 | 13.5 |
| Maximum Torque | 43.5 | 43.5 | 46.4 | 46.0 | 46.5 | 44.5 | 43.0 | 41.9 | 40.0 | 46.0 | 46.5 | 51.5 | 48.5 | 49.0 | 48.5 | 47.0 | 46.5 | 44.5 | thiuram sulfides or dithiocarbamates shown in Table 4 below.

Separate portions of these compositions were then compounded with 0.05 gram of copper 2-mercaptobenzothiazole.

TABLE 4

| Thiuram or Dithiocarbamate | Mooney Scorch, $T_s$, Minutes at 270° F. | | Monsanto Oscillating Disc Rheometer at 316° F | | | |
|---|---|---|---|---|---|---|
| | | | Maximum Cure Rate | | Maximum Torque | |
| | No CuMBT | With CuMBT | No CuMBT | With CuMBT | No CuMBT | With CuMBT |
| Tetramethyl thiuram sulfide | 26.4 | 14.6 | 3.7 | 4.5 | 44.0 | 47.5 |
| Tetramethyl thiuram disulfide | 20.2 | 11.7 | 3.4 | 4.9 | 45.0 | 48.0 |
| Tetraethyl thiuram disulfide | 24.5 | 15.9 | 2.9 | 4.1 | 42.5 | 48.0 |
| Mixed thiuram disulfide from dimethyl- and diethylamines (Vanderbilt) | 22.5 | 13.9 | 2.8 | 4.5 | 44.0 | 48.0 |
| Bis(morpholinothiocarbonyl)-disulfide | 23.3 | 15.0 | 2.3 | 3.4 | 43.5 | 44.5 |
| Bis(morpholinothiocarbonyl)-monosulfide | 27.8 | 18.0 | 1.8 | 2.4 | 42.0 | 42.0 |
| Dipentamethylene thiuram hexasulfide | 20.9 | 11.8 | 1.8 | 2.7 | 42.5 | 45.0 |
| Zinc dimethyl dithiocarbamate | 21.0 | 12.0 | 2.5 | 4.6 | 42.5 | 45.0 |
| Zinc dibutyl dithiocarbamate | 28.2 | 19.2 | 1.9 | 3.1 | 41.0 | 44.5 |
| Cadmium diethyl dithiocarbamate | 21.9 | 14.3 | 2.4 | 3.9 | 43.5 | 46.5 |
| Tellurium diethyl dithiocarbamate | 23.3 | 15.2 | 2.9 | 4.0 | 49.5 | 52.0 |
| Tetrabutyl thiuram disulfide | 28.4 | 19.9 | 2.1 | 3.4 | 42.0 | 46.0 |
| Bismuth dimethyl dithiocarbamate | 12.4 | 10.0 | 2.8 | 3.1 | 45.0 | 46.5 |
| Zinc dibenzyl dithiocarbamate | 29.3 | 19.9 | 1.9 | 2.7 | 40.0 | 44.5 |
| Control | 37.9 | 29.0 | 1.0 | 1.0 | 36.5 | 41.5 |

I claim:

1. A rubber vulcanization accelerator composition comprising (a) from about 0.1 to 1.5 parts of a benzothiazole-2-sulfenamide, (b) from about 0.02 to 1.5 parts of a thiuram sulfide or a metal dithiocarbamate, said metal being selected from the group consisting of zinc, cadmium, tellurium, bismuth, nickel, selenium and lead, and (c) from about 0.002 to 1.5 parts of copper 2-mercaptobenzothiazole per each 100 parts of said rubber; the weight ratio of said components (a), (b) and (c) being in the range from about 10:1:0.05 to 1:1:1, respectively.

2. The composition according to claim 1 wherein said benzothiazole-2-sulfenamide is N-oxydiethylene benzothiazole-2-sulfenamide.

3. The composition according to claim 1 wherein said benzothiazole-2-sulfenamide is N-cyclohexyl benzothiazole-2-sulfenamide.

4. The composition according to claim 1 wherein said benzothiazole-2-sulfenamide is N-tert-butyl benzothiazole-2-sulfenamide.

5. The composition according to claim 1 wherein said benzothiazole-2-sulfenamide is N,N-diisopropyl benzothiazole-2-sulfenamide.

6. The composition according to claim 1 wherein said benzothiazole-2-sulfenamide is N,N-dicyclohexyl benzothiazole-2-sulfenamide.

7. The composition according to claim 1 wherein said thiuram sulfide is tetramethyl thiuram monosulfide.

8. The composition according to claim 1 wherein said thiuram sulfide is tetramethyl thiuram disulfide.

9. The composition according to claim 1 wherein the metal dithiocarbamate is zinc dimethyl dithiocarbamate.

10. A method for increasing the processing safety of a rubber vulcanization accelerator composition comprising (a) from about 0.1 to 1.5 parts of a benzothiazole-2-sulfenamide, and (b) from about 0.02 to 1.5 parts of a thiuram sulfide or a metal dithiocarbamate, said metal being selected from the group consisting of zinc, cadmium, tellurium, bismuth, nickel, selenium and lead; which comprises adding from about 0.002 to 1.5 parts of copper 2-mercaptobenzothiazole per each 100 parts of said rubber, the weight ratio of components (a) and (b) to the copper 2-mercaptobenzothiazole being in the range from about 10:1:0.05 to 1:1:1.

* * * * *

UNITED STATES PATENT OFFICE
CERTIFICATE OF CORRECTION

Patent No. 4,012,332                    Dated March 15, 1977

Inventor(s) RUDOLF ADOLF BEHRENS

It is certified that error appears in the above-identified patent and that said Letters Patent are hereby corrected as shown below:

Col. 3, line 17, in place of "Case No. 25,165" substitute therefor -- Serial No. 430,865, now abandoned --.

Signed and Sealed this

Seventh Day of June 1977

[SEAL]

Attest:

RUTH C. MASON
Attesting Officer

C. MARSHALL DANN
Commissioner of Patents and Trademarks